US012736739B2

(12) United States Patent
Zheng

(10) Patent No.: US 12,736,739 B2

(45) Date of Patent: Sep. 15, 2026

(54) WAVEGUIDE ASSEMBLY, OPTICAL DEVICE AND INTELLIGENT GLASSES

(71) Applicant: GUANGDONG OPPO MOBILE TELECOMMUNICATIONS CORP., LTD., Dongguan (CN)

(72) Inventor: Guang Zheng, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 393 days.

(21) Appl. No.: 18/396,574

(22) Filed: Dec. 26, 2023

(65) Prior Publication Data

US 2024/0126005 A1 Apr. 18, 2024

Related U.S. Application Data

(63) Continuation of application No. PCT/CN2022/099554, filed on Jun. 17, 2022.

(30) Foreign Application Priority Data

Jul. 26, 2021 (CN) ......................... 202110845991.3
Jul. 26, 2021 (CN) ......................... 202121714112.5

(51) Int. Cl.
*G02B 6/10* (2006.01)
*F21V 8/00* (2006.01)

(52) U.S. Cl.
CPC ......... *G02B 6/0076* (2013.01); *G02B 6/0016* (2013.01); *G02B 6/0036* (2013.01); *G02B 6/0088* (2013.01)

(58) Field of Classification Search
CPC .. G02B 6/0076; G02B 6/0016; G02B 6/0036; G02B 6/0088; G02B 6/10; G02B 27/0172; G02B 5/18; G02B 27/0081
See application file for complete search history.

(56) References Cited

U.S. PATENT DOCUMENTS 6,278,534 B1 * 8/2001 Arns .................... G01J 3/0259 359/566
12,345,915 B1 * 7/2025 Krishnamurthy ........ G02B 6/10
2017/0131551 A1 5/2017 Robbins et al.

(Continued)

FOREIGN PATENT DOCUMENTS

CN 106950697 B 8/2019
CN 110462487 A 11/2019

(Continued)

OTHER PUBLICATIONS

Chinese First Office Action in Chinese Patent Application No. 202110845991.3, mailed on Dec. 26, 2024.

(Continued)

*Primary Examiner* — Jennifer Doan

(74) *Attorney, Agent, or Firm* — Ladas & Parry, LLP

(57) ABSTRACT

A waveguide assembly, an optical device and smart glasses are provided. The waveguide assembly includes a first waveguide layer, a second waveguide layer, and a first spacing layer. The first spacing layer includes a first region and a second region. A refractive index of the first region is less than that of the first waveguide layer and that of the second waveguide layer. A refractive index of the second region is less than that of the first region.

20 Claims, 7 Drawing Sheets

(56) References Cited

U.S. PATENT DOCUMENTS

| | | | | |
|---|---|---|---|---|
| 2020/0209447 | A1 | 7/2020 | Lee et al. | |
| 2020/0409145 | A1 | 12/2020 | Bablumyan | |
| 2021/0294101 | A1 * | 9/2021 | Cole | G02B 27/0081 |

FOREIGN PATENT DOCUMENTS

| | | | |
|---|---|---|---|
| CN | 110596807 | A | 12/2019 |
| CN | 111308717 | A | 6/2020 |
| CN | 111830715 | A | 10/2020 |
| CN | 211826603 | U | 10/2020 |
| CN | 113433614 | A | 9/2021 |
| CN | 215264107 | U | 12/2021 |
| WO | 2023005501 | A1 | 2/2023 |

OTHER PUBLICATIONS

Notification to Grant Patent Right for Invention for Chinese Application No. 202121714112.5, mailed Nov. 17, 2021.

International Search Report for International Application No. PCT/CN2022/099554, mailed Aug. 29, 2022, with English translation provided by WIPO.

Written Opinion of the International Searching Authority for International Application No. PCT/CN2022/099554, mailed Aug. 29, 2022, with partial translation by the applicant's foreign counsel and machine English translation provided by WIPO.

* cited by examiner

WAVEGUIDE ASSEMBLY, OPTICAL DEVICE AND INTELLIGENT GLASSES

CROSS-REFERENCE TO RELATED APPLICATIONS

The present application is a continuation of International Patent Application No. PCT/CN2022/099554, filed Jun. 17, 2022, which claims priorities to Chinese Patent Application No. 202110845991.3, filed Jul. 26, 2021, and Chinese Patent Application No. 202121714112.5, filed Jul. 26, 2021, all of which are herein incorporated by reference in their entireties.

TECHNICAL FIELD

The present disclosure relates to the field of optical technologies, and in particular to a waveguide assembly, an optical device, and smart glasses.

BACKGROUND

With the rapid development of augmented reality (AR) technology, wearable devices such as smart glasses have gained more and more applications. After wearing the smart glasses with AR function, users may experience the combination of virtual scenes and real scenes.

The smart glasses are usually provided with a waveguide. Light rays emitted by an image source are transmitted through the waveguide, so that human eyes may observe the virtual scenes.

SUMMARY OF THE DISCLOSURE

The embodiments of the present disclosure provide a waveguide assembly, an optical device, and smart glasses.

An embodiment of the present disclosure provides a waveguide assembly. The waveguide assembly includes a first waveguide layer, a second waveguide layer stacked with the first waveguide layer, and a first spacing layer arranged between the first waveguide layer and the second waveguide layer.

The first spacing layer includes a first region and a second region, a refractive index of the first region is less than that of the first waveguide layer and that of the second waveguide layer, and a refractive index of the second region is less than that of the first region.

In response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray; and the second region is configured to allow a second light ray of a second viewing angle in the light rays to pass through the second region, so that the first waveguide layer and the second waveguide layer are configured to jointly transmit the second light ray.

An embodiment of the present disclosure further provides an optical device. The optical device includes a waveguide assembly, an in-coupling grating, and a first out-coupling grating.

The waveguide assembly includes a first waveguide layer, a second waveguide layer stacked with the first waveguide layer, and a first spacing layer arranged between the first waveguide layer and the second waveguide layer. The first spacing layer includes a first region and a second region, a refractive index of the first region is less than that of the first waveguide layer and that of the second waveguide layer, and a refractive index of the second region is less than that of the first region.

In response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray; and the second region is configured to allow a second light ray of a second viewing angle in the light rays to pass through the second region, so that the first waveguide layer and the second waveguide layer are configured to jointly transmit the second light ray.

The in-coupling grating is disposed on a side of the first waveguide layer away from the second waveguide layer, wherein the in-coupling grating corresponds to the first region.

The first out-coupling grating is disposed on the side of the first waveguide layer away from the second waveguide layer, wherein the first out-coupling grating corresponds to the second region.

In response to the light rays are transmitted from the side of the second waveguide layer towards the first region to the first waveguide layer, the light ray is coupled into the waveguide assembly through the in-coupling grating, and the first light ray and the second light ray are coupled out by the first out-coupling grating.

An embodiment of the present disclosure further provides smart glasses including a frame and an optical device installed on the frame. The optical device includes a waveguide assembly, an in-coupling grating, and a first out-coupling grating.

The waveguide assembly includes a first waveguide layer, a second waveguide layer stacked with the first waveguide layer, and a first spacing layer arranged between the first waveguide layer and the second waveguide layer. The first spacing layer includes a first region and a second region, a refractive index of the first region is less than that of the first waveguide layer and that of the second waveguide layer, and a refractive index of the second region is less than that of the first region.

In response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray; and the second region is configured to allow a second light ray of a second viewing angle in the light rays to pass through the second region, so that the first waveguide layer and the second waveguide layer are configured to jointly transmit the second light ray.

The in-coupling grating is disposed on a side of the first waveguide layer away from the second waveguide layer, wherein the in-coupling grating corresponds to the first region.

The first out-coupling grating is disposed on the side of the first waveguide layer away from the second waveguide layer, wherein the first out-coupling grating corresponds to the second region.

In response to the light rays are transmitted from the side of the second waveguide layer towards the first region to the first waveguide layer, the light ray is coupled into the waveguide assembly through the in-coupling grating, and the first light ray and the second light ray are coupled out by the first out-coupling grating.

BRIEF DESCRIPTION OF THE DRAWINGS

In order to more clearly illustrate the technical solutions in some embodiments of the present disclosure, hereinafter, a brief introduction will be given to the accompanying drawings that are used in the description of some embodiments. Obviously, the accompanying drawings in the description below are merely some embodiments of the present disclosure. For those of ordinary skill in the art, other accompanying drawings may be obtained based on these accompanying drawings without any creative efforts.

DETAILED DESCRIPTION

The technical solutions in some embodiments of the present disclosure may be clearly and completely described in conjunction with accompanying drawings in some embodiments of the present disclosure. Obviously, the described embodiments are only a part of the embodiments of the present disclosure, and not all embodiments. Based on the embodiments in the present disclosure, all other embodiments obtained by those of ordinary skill in the art without creative effort are within the scope of the present disclosure.

An embodiment of the present disclosure provides an optical device. The optical device may be applied to smart glasses, so that a user may observe an image formed by combining an actual scene and a virtual scene through the smart glasses, thereby experiencing the combination of virtual and the reality.

Figure 1:
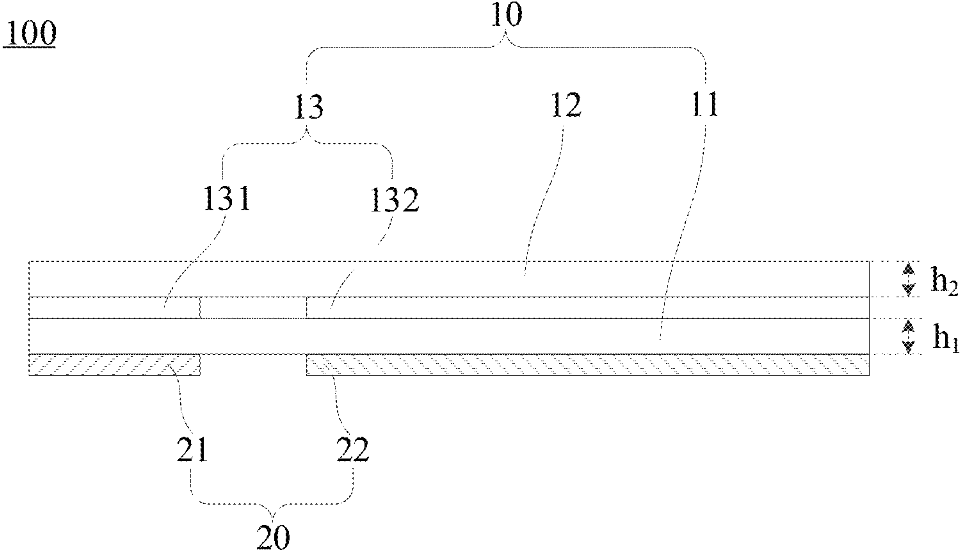
FIG. 1 is a first structural schematic view of an optical device in some embodiments of the present disclosure.

As illustrated in FIG. 1, FIG. 1 is a first structural schematic view of an optical device 100 in some embodiments of the present disclosure. The optical device 100 includes a waveguide assembly 10 and a grating assembly 20, and the grating assembly 20 is disposed on a side of the waveguide assembly 10. The waveguide assembly 10 may be configured to transmit a light ray. The grating assembly 20 may be configured to couple the light ray, such as coupling the light ray into the waveguide assembly 10, and coupling the light ray transmitted in the waveguide assembly 10 out of the waveguide assembly 10.

The waveguide assembly 10 includes a first waveguide layer 11, a second waveguide layer 12, and a first spacing layer 13. The second waveguide layer 12 and the first waveguide layer 11 are stacked on each other, and the first spacing layer 13 is disposed between the first waveguide layer 11 and the second waveguide layer 12. Each of the first waveguide layer 11 and the second waveguide layer 12 may be made of a material that facilitates light transmission, such as glass. A thickness of the first waveguide layer 11 is defined as $h_1$, and a refractive index of the first waveguide layer 11 is defined as $n_1$. A thickness of the second waveguide layer 12 is defined as $h_2$, and a refractive index of the second waveguide layer 12 is defined as $n_2$. The thickness $h_1$ of the first waveguide layer 11 and the thickness $h_2$ of the second waveguide layer 12 are shown in FIG. 1. In some embodiments, the refractive index of the first waveguide layer 11 may be the same as the refractive index of the second waveguide layer 12, i.e., $n_1$ is equal to $n_2$. For example, both $n_1$ and $n_2$ are equal to n.

The first spacing layer 13 includes a first region 131 and a second region 132, and the first region 131 and the second region 132 may be spaced apart from each other. A refractive index $n_{d1}$ of the first region 131 may be close to the refractive index $n_1$ of the first waveguide layer 11 and the refractive index $n_2$ of the second waveguide layer 12. The refractive index $n_{d1}$ of the first region 131 may be less than the refractive index $n_1$ of the first waveguide layer 11 and the refractive index $n_2$ of the second waveguide layer 12. In response to the refractive index of the first waveguide layer 11 and the refractive index of the second waveguide layer 12 are the same and are equal to n, the refractive index $n_{d1}$ of the first region 131 is less than n. A refractive index $n_{d2}$ of the second region 132 is less than the refractive index $n_{d1}$ of the first region 131.

In a practical application, in response to the light ray is transmitted from a side of the second waveguide layer 12 towards the first region 131 to the first waveguide layer 11, the first region 131 may reduce a transverse transmission period of the light ray. The transverse transmission period is a period when the light ray is transmitted in the waveguide assembly 10. The second region 132 may allow a first light ray of a first viewing angle in the light rays to be fully reflected, so that the first waveguide layer 11 may independently transmit the first light ray. A second light ray of a second viewing angle in the light rays may pass through the second region 132, so that the first waveguide layer 11 and the second waveguide layer 12 may jointly transmit the second light ray.

In response to the first region 131 is not disposed, the light ray is normally transmitted in the waveguide assembly 10. Due to the refractive index $n_{d1}$ of the first region 131 being less than the refractive index $n_1$ of the first waveguide layer 11 and the refractive index $n_2$ of the second waveguide layer 12, in response to the first region 131 is disposed, a transmission path of the light ray may be changed to reduce the transverse transmission period of the light ray.

In response to the second region 132 is not disposed, the light ray is normally transmitted in the waveguide assembly 10. The refractive index nae of the second region 132 is less than the refractive index $n_{d1}$ of the first region 131, thus the refractive index $n_{d2}$ of the second region 132 is less than the refractive index $n_1$ of the first waveguide layer 11 and the refractive index $n_2$ of the second waveguide layer 12. In response to the second region 132 is disposed, the transmission path of the light ray may be changed. For the light rays of different viewing angles, the changing effect is different. For example, the first light ray of the first viewing angle in the light rays may be fully reflected in the second region 132, so that the first waveguide layer 11 may independently transmit the first light ray. The second light ray of the second viewing angle of the light rays may pass through the second region 132, so that the first waveguide layer 11 and the second waveguide layer 12 may jointly transmit the second light ray.

The grating assembly 20 includes an in-coupling grating 21 and a first out-coupling grating 22. The in-coupling grating 21 and the first out-coupling grating 22 may be one-dimensional gratings. For example, both the in-coupling grating 21 and the first out-coupling grating 22 may be transmissive gratings or reflective gratings. The in-coupling grating 21 is disposed on a side of the first waveguide layer 11 away from the second waveguide layer 12. The in-coupling grating 21 corresponds to the first region 131. The in-coupling grating 21 may couple the light ray into the waveguide assembly 10 for transmission. The first out-coupling grating 22 is disposed on the side of the first waveguide layer 11 away from the second waveguide layer 12. The first out-coupling grating 22 corresponds to the second region 132. The first out-coupling grating 22 may couple the light ray transmitted in the waveguide assembly 10 from the waveguide assembly 10 to the outside.

The first region 131 of the first spacing layer 13 may reduce the transverse transmission period of the light ray, thus the number of times of the light ray acting on the in-coupling grating 21 may be increased in response to the light ray is coupled into the waveguide assembly 10 from the in-coupling grating 21, thereby improving the in-coupling efficiency of the light ray.

Figure 2:
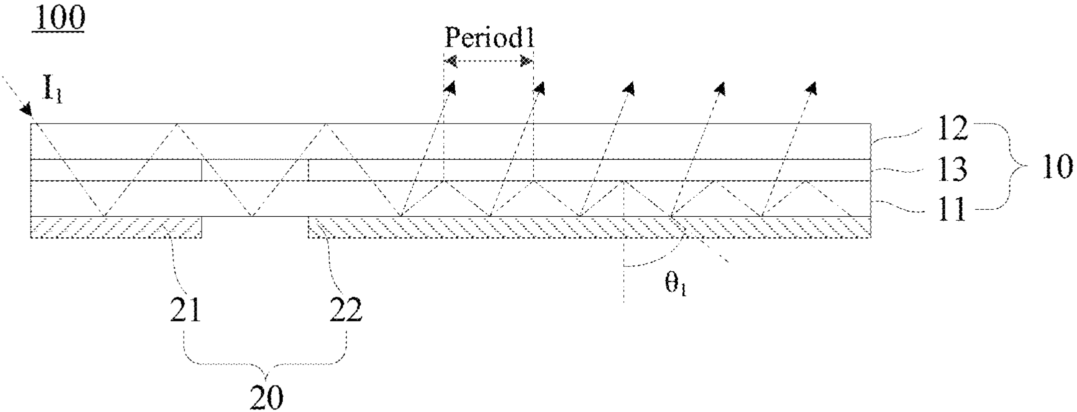
FIG. 2 is a first schematic view illustrating light rays transmitting in the optical device in some embodiments of the present disclosure.

As illustrated in FIG. 2, FIG. 2 is a first schematic view illustrating light rays transmitting in the optical device 100 in some embodiments of the present disclosure.

In response to the first light ray $I_1$ is transmitted from the side of the second waveguide layer 12 towards the first region 131 to the first waveguide layer 11, the first light ray I is coupled into the waveguide assembly 10 through the in-coupling grating 21 for transmission. The transmission period of the first light ray $I_1$ in the waveguide assembly 10 is defined as Period1, and a diffraction angle of the first light ray $I_1$ is defined as $\theta_1$. The first light ray $I_1$ may be fully reflected in the second region 132 of the first spacing layer 13, so that the first waveguide layer 11 may independently transmit the first light ray $I_1$. In this case, $\text{Period1}=2*h_1*\tan(\theta_1)$. Subsequently, the first light ray $I_1$ transmitted in the first waveguide layer 11 is coupled from the first waveguide layer 11 to the outside by the first out-coupling grating 22. The diffraction angle $\theta_1$ is an angle between a normal of the first out-coupling grating 22 and a transmission direction of the first light ray $I_1$ that is fully reflected in the second region 132 of the first spacing layer 13.

Figure 3:
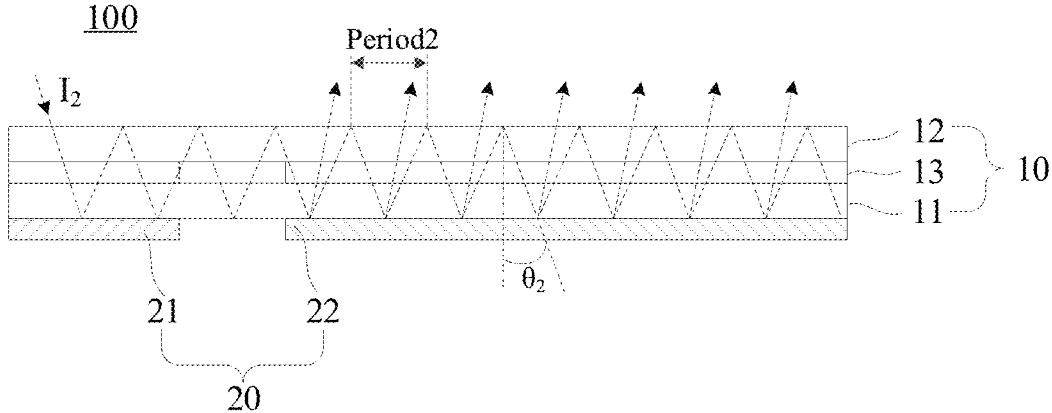
FIG. 3 is a second schematic view illustrating light rays transmitting in the optical device in some embodiments of the present disclosure.

As illustrated in FIG. 3, FIG. 3 is a second schematic view illustrating light rays transmitting in the optical device 100 in some embodiments of the present disclosure.

In response to a second light ray $I_2$ is transmitted from a side of the second waveguide layer 12 towards the first region 131 to the first waveguide layer 11, the second light ray $I_2$ is coupled into the waveguide assembly 10 through the in-coupling grating 21 for transmission. A transmission period of the second light ray $I_2$ in the waveguide assembly 10 is defined as Period2, and a diffraction angle of the second light ray $I_2$ is defined as $\theta_2$. The second light ray $I_2$ may pass through the second region 132 of the first spacing layer 13, and may be fully reflected on a surface of the second waveguide layer 12 away from the first waveguide layer 11, so that the second light ray $I_2$ may be jointly transmitted by the first waveguide layer 11 and the second waveguide layer 12. In this case, $\text{Period2}=2*(h_1+h_2)*\tan(\theta_2)$. Subsequently, the second light ray $I_2$ jointly transmitted by the first waveguide layer 11 and the second waveguide layer 12 is coupled to the outside by the first out-coupling grating 22. The diffraction angle $\theta_2$ is an angle between a normal of the first out-coupling grating 22 and a transmission direction of the second light ray $I_2$ that is fully reflected on a side of the second waveguide layer 12 away from the first waveguide layer 11.

In response to the light ray is transmitted from the side of the second waveguide layer 12 towards the first region 131 to the first waveguide layer 11, the light ray is a mixture of the light rays formed by the light rays of a plurality of viewing angles. Each of the first light ray $I_1$ and the second light ray $I_2$ is a light ray of a certain viewing angle in the incident mixed light rays. For example, the first light ray $I_1$ is the light ray at the first viewing angle, the second light ray $I_2$ is the light ray at the second viewing angle, and the first viewing angle and the second viewing angle are different viewing angles. For example, in actual application, the first viewing angle may include an angle of 20°, and the second viewing angle may include an angle of 0°.

In some embodiments, in order to fully reflect the first light ray $I_1$ in the second region 132 and pass the second light ray $I_2$ through the second region 132, the diffraction angle $\theta_1$ of the first light ray $I_1$ and the diffraction angle $\theta_2$ of the second light ray $I_2$ satisfy the following relational expressions:

$$\theta_1>\sin^{-1}(n_{d2}/n), \text{ and}$$

$$\theta_2\leq\sin^{-1}(n_{d2}/n),$$

wherein n represents the refractive index of the first waveguide layer 11 and the refractive index of the second waveguide layer 12, and the refractive index of the first waveguide layer 11 is the same as that of the second waveguide layer 12. $n_{d2}$ represents the refractive index of the second region 132, $\theta_1$ represents the diffraction angle of the first light ray $I_1$, and $\theta_2$ represents the diffraction angle of the second light ray $I_2$.

$\sin^{-1}(n_{d2}/n)$ represents a critical angle of the diffraction angle when the light ray is fully reflected in the second region 132. The diffraction angle $\theta_1$ of the first light ray $I_1$ is greater than the critical angle, so that the first light ray $I_1$ may be fully reflected. The diffraction angle $\theta_2$ of the second light ray $I_2$ is less than or equal to the critical angle, so that the second light ray $I_2$ may be not fully reflected, and the second light ray $I_2$ passes through the second region 132.

In a practical application example, the period of the in-coupling grating 21 may be set to 400 nm, a wavelength of each of the first light ray $I_1$ and the second light ray $I_2$ is 520 nm, the refractive index n of each of the first waveguide layer 11 and the second waveguide layer 12 is 1.7, each of the thickness $h_1$ of the first waveguide layer 11 and the thickness $h_2$ of the second waveguide layer 12 is 0.4 mm, and the refractive index $n_{d2}$ of the second region 132 of the spacing layer 13 is 1.5. In this case, a fully reflecting critical angle $\beta$ at the interface of the second region 132 is 61.9°.

In response to the first light ray $I_1$ is transmitted at an angle of 20°, the diffraction angle θ1 of the first light ray $I_1$ is 74.99°, which is greater than the fully reflecting critical angle β. Thus, the first light ray $I_1$ may be fully reflected at the interface of the second region 132. Thus, the first light ray $I_1$ may be independently transmitted in the first waveguide layer 11. In this case, the transmission period Period1 of the first light ray $I_1$ is 2.98 mm.

In response to the second light ray $I_2$ is transmitted at an angle of 0°, that is the second light ray $I_2$ vertically enters the in-coupling grating 21, the diffraction angle $\theta_2$ of the second light ray $I_2$ is 49.88°, which is less than the fully reflecting critical angle β. Thus, the second light ray $I_2$ may not be fully reflected at the interface of the second region 132. Thus, the second light ray $I_2$ may be jointly transmitted in the first waveguide layer 11 and the second waveguide layer 12. In this case, the transmission period Period2 of the second light ray $I_2$ is 1.89 mm.

Thus, in this case, the transmission period Period1 of the first light ray $I_1$ is relatively close to the transmission period Period2 of the second light ray $I_2$.

In some embodiments, the transverse transmission period Period1 of the first light ray $I_1$ is the same as the transverse transmission period Period2 of the second light ray $I_2$ in the first waveguide layer 11 and the second waveguide layer 12. In this case, a pupil density of the first light ray $I_1$ emitted by the optical device 100 is the same as a pupil density of the second light ray $I_2$ emitted by the optical device 100, and the uniformity of the first light ray $I_1$ and the second light ray $I_2$ are the best.

In response to the transverse transmission period Period1 of the first light ray $I_1$ is the same as the transverse transmission period Period2 of the second light ray $I_2$, the thickness of the first waveguide layer 11 and the thickness of the second waveguide layer 12 satisfy the following relational expression:

$$2*(h_1+h_2)*\tan(\theta_2)=2h_1*\tan(\theta_1),$$

wherein $h_1$ represents the thickness of the first waveguide layer 11, and $h_2$ represents the thickness of the second waveguide layer 12.

In some embodiments, the thickness $h_1$ of the first waveguide layer 11 ranges from 0.05 mm to 3 mm. The thickness $h_2$ of the second waveguide layer 12 ranges from 0.05 mm to 3 mm. The refractive index n of each of the first waveguide layer 11 and the second waveguide layer 12 ranges from 1.6 to 2.1. The refractive index $n_{d1}$ of the first region 131 is close to the refractive index n of each of the first waveguide layer 11 and the second waveguide layer 12. The refractive index $n_{d2}$ of the second region 132 ranges from 1.3 to 1.6.

For example, in the above described practical application example, the period of the in-coupling grating 21 is set to 400 nm, and the wavelength of each of the first light ray $I_1$ and the second light ray $I_2$ is 520 nm, the refractive index n of each of the first waveguide layer 11 and the second waveguide layer 12 is 1.7, and each of the thickness $h_1$ of the first waveguide layer 11 and thickness $h_2$ of the second waveguide layer 12 is 0.4 mm, the refractive index $n_{d2}$ of the second region 132 of the spacing layer 13 is 1.5. In this case, the fully reflecting critical angle β at the interface of the second region 132 is 61.9°.

In response to the first light ray $I_1$ is transmitted at 15.398°, the diffraction angle $\theta_1$ of the first light ray $I_1$ is 67.058°, which is greater than the fully reflecting critical angle β. Thus, the first light ray $I_1$ may be fully reflected at the interface of the second region 132. In this case, the transmission period Period1 of the first light ray $I_1$ is 1.89 mm.

In response to the second light ray $I_2$ is transmitted at an angle of 0°, that is the second light ray $I_2$ vertically enters the in-coupling grating 21, the diffraction angle $\theta_2$ of the second light ray $I_2$ is 49.88°, which is less than the fully reflecting critical angle β. Thus, the second light ray $I_2$ may not be fully reflected at the interface of the second region 132. In this case, the transmission period Period2 of the second light ray 12 is 1.89 mm.

Thus, in this case, the transmission period Period1 of the first light ray $I_1$ is the same as the transmission period Period2 of the second light ray $I_2$.

In the optical device 100 provided by the embodiments of the present disclose, the first spacing layer 13 is disposed, the first spacing layer 13 is defined as a first region 131 and a second region 132, the second region 132 may allow the first light ray at the first viewing angle to be fully reflected, and the second light ray of the second viewing angle may pass through the second region 132. Thus, the light rays of different viewing angles may be transmitted in different waveguide layers, and accordingly, the transmission periods of the light rays of different viewing angles may be adjusted respectively, so that the transmission periods of the light rays of different viewing angles tend to be close to each other. Thus, the pupil density of the light rays of different viewing angles that are emitted by the optical device 100 may be close to each other, thereby improving the uniformity of the light rays emitted by the optical device 100.

Figure 4:
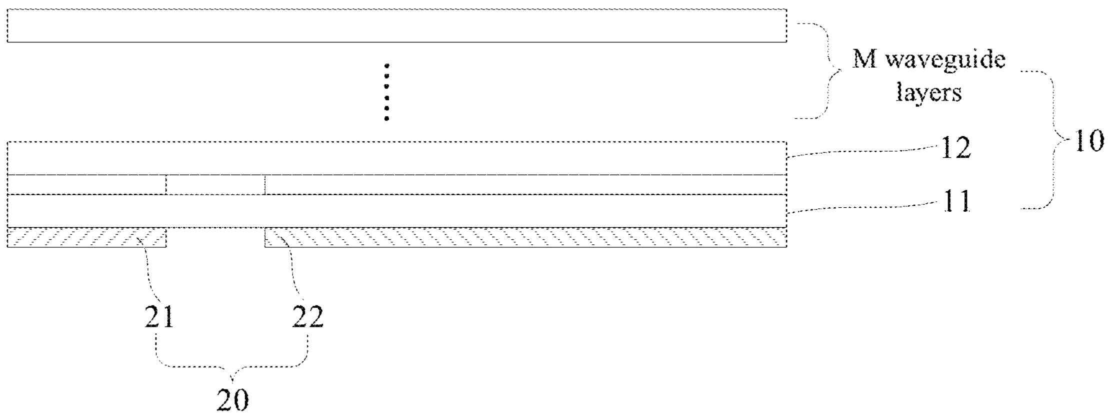
FIG. 4 is a second structural schematic view of the optical device in some embodiments of the present disclosure.

In some embodiments, as illustrated in FIG. 4, FIG. 4 is a second structural schematic view of the optical device 100 in some embodiments of the present disclosure.

The waveguide assembly 10 further includes M waveguide layers. The M waveguide layers are sequentially stacked from the side of the second waveguide layer 12 away from the first waveguide layer 11. In this case, the number of the waveguide layers included in the waveguide assembly 10 is M+2.

The waveguide assembly 10 is further provided with a plurality of spacing layers. A N-th spacing layer is disposed between a N-th waveguide layer and a (N+1)-th waveguide layer. The refractive index of the N-th spacing layer is less than that of the first waveguide layer 11 to a (M+2)-th waveguide layer. The first waveguide layer 11 to a P-th waveguide layer may jointly transmit a P-th light ray $I_p$ of a P-th viewing angle in the incident light rays.

M, N, P are positive integers, N is greater than or equal to 2 and less than or equal to M+1, and P is greater than or equal to 3 and less than or equal to M+2. For example, M may be 1, 5, 8, etc. For example, in response to M is 5, N may be 2, 3, 4, 5, or 6, and P may be 3, 4, 5, 6, or 7.

In some embodiments, the refractive index of the first waveguide layer 11, the refractive index of the second waveguide layer 12, and the refractive indexes of the M waveguide layers are the same. For example, the refractive index of the first waveguide layer 11, the refractive index of the second waveguide layer 12, and the refractive indexes of the M waveguide layers are equal to n.

In response to P<M+2, a diffraction angle $\theta_p$ the P-th light ray $I_p$ satisfies the following relational expression:

$$\sin^{-1}(n_{d(p+1)}/n<\theta_p\leq\sin^{-1}(n_{d(p)}/n),$$

wherein $n_{d(p+1)}$ represents a refractive index of a p-th spacing layer, $n_{d(p)}$ represents a refractive index of a (P-1)-th spacing layer; and n represents the refractive index of each of the first waveguide layer 11, the second waveguide layer 12, and the M waveguide layers.

Thus, the P-th light ray $I_p$ may pass through the spacing layers before the P-th spacing layer, and may be fully reflected at the P-th spacing layer. The (M+2)-th light ray may not be fully reflected at the spacing layer, but may be jointly transmitted by all the waveguide layers.

In some embodiments, the transverse transmission period of the first light ray $I_1$, the transverse transmission period of the second light ray $I_2$, and the transverse transmission period of the P-th light ray $I_p$ are the same.

The thickness of each waveguide layer satisfies the following relational expression:

$$2^*(h_1+h_2+\ldots h_p)^*\tan(\theta_p)=2^*h_1^*\tan(\theta_1),$$

wherein $h_p$ represents the thickness of the P-th waveguide layer, $\theta_p$ represents the diffraction angle of the P-th light ray $I_p$.

In some embodiments, the thickness of each of the M waveguide layers ranges from 0.05 mm to 3 mm, and the refractive index of each waveguide layer ranges from 1.6 to 2.1. In the plurality of spacing layers, the refractive index of the N-th spacing layer ranges from 1.3 to 1.6. That is, the refractive index of each spacing layer ranges from 1.3 to 1.6.

The more the number of the waveguide layers included in the waveguide assembly 10, the finer the division of the viewing angle of the incident light ray, so that the incident light ray may be divided into more light rays with different viewing angles. The light rays with different viewing angles are transmitted in different waveguide layers, so that the uniformity of the light rays emitted by the optical device 100 may be better.

Figure 5:
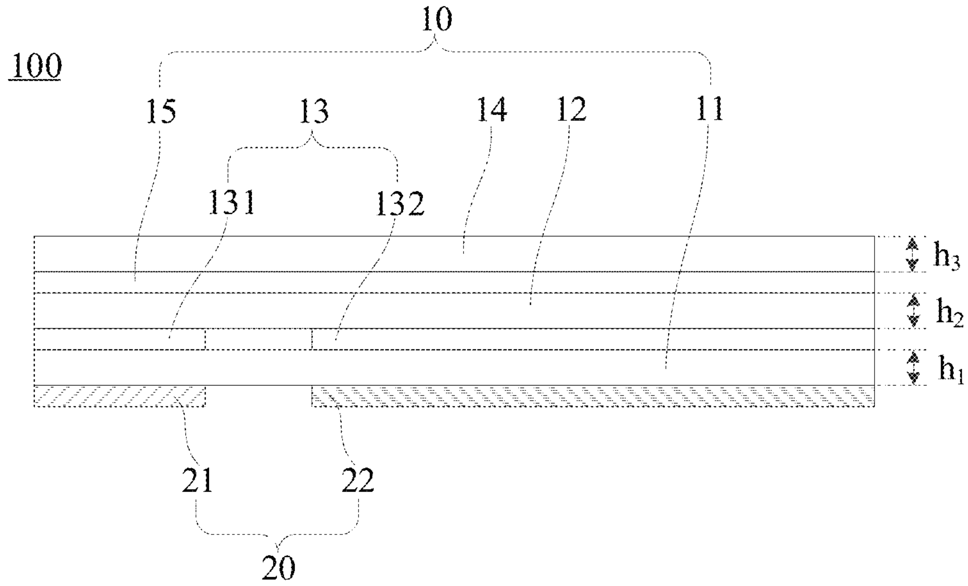
FIG. 5 is a third structural schematic view of the optical device in some embodiments of the present disclosure.

In some embodiments, as illustrated in FIG. 5, FIG. 5 is a third structural schematic view of the optical device 100 in some embodiments of the present disclosure.

FIG. 5 shows the situation that M is 1. The waveguide assembly 10 further includes a third waveguide layer 14. The third waveguide layer 14 is disposed on the side of the second waveguide layer 12 away from the first waveguide layer 11. A thickness of the third waveguide layer 14 is defined as h3, and a refractive index of the third waveguide layer 14 is defined as n3. The refractive index n3 of the third waveguide layer 14 is the same as the refractive index of the first waveguide layer 11 and the refractive index of the second waveguide layer 12, which may be n.

A second spacing layer 15 is disposed between the second waveguide layer 12 and the third waveguide layer 14. A refractive index of the second spacing layer 15 is defined as $n_{d3}$, and $n_{d3}$ is less than n.

Figure 6:
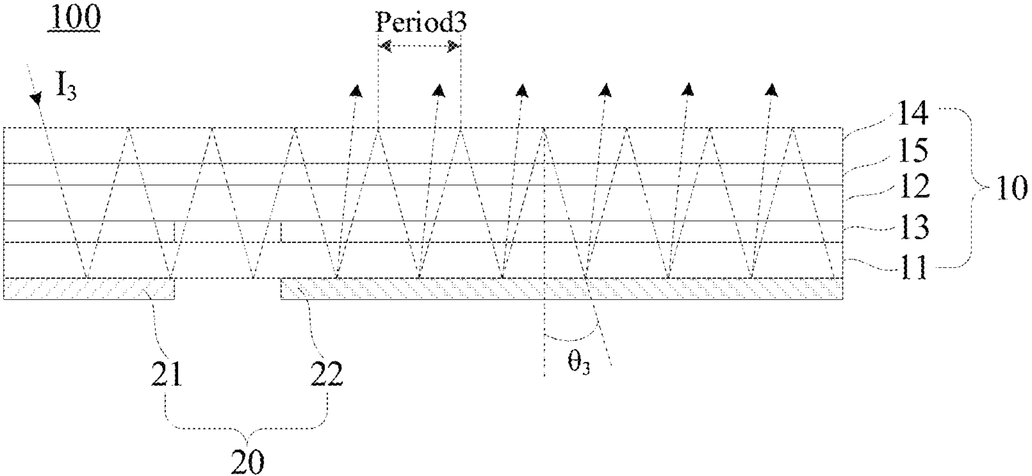
FIG. 6 is a third schematic view illustrating light rays transmitting in the optical device in some embodiments of the present disclosure.

As illustrated in FIG. 6, FIG. 6 is a third schematic view illustrating light rays transmitting in the optical device 100 in some embodiments of the present disclosure.

In response to the third light ray 13 is transmitted from the side of the second waveguide layer 12 towards the first region 131 to the first waveguide layer 11, the third light ray 13 is coupled into the waveguide assembly 10 through the in-coupling grating 21 for transmission. A transmission period of the third light ray 13 in the waveguide assembly 10 is defined as Period3, and a diffraction angle of the third light ray $I_3$ is defined as $\theta_3$. The third light ray $I_3$ may pass through the second region 132 of the first spacing layer 13 and pass through the second spacing layer 15, and be fully reflected on the surface of the third waveguide layer 14 away from the first waveguide layer 11. Thus, the third light ray $I_3$ may be jointly transmitted by the first waveguide layer 11, the second waveguide layer 12, and the third waveguide layer 14. In this case, Period3=$2^*(h_1+h_2+h_3)^*\tan(\theta_3)$. Subsequently, the third light ray $I_3$ jointly transmitted by the first waveguide layer 11, the second waveguide layer 12, and the third waveguide layer 14 is coupled to the outside by the first out-coupling grating 22. The diffraction angle $\theta_3$ is an angle between the normal of the first out-coupling grating 22 and the transmission direction of the third light ray $I_3$ that is fully reflected on the surface of the third waveguide layer 14 away from the first waveguide layer 11.

Because $\theta_3 \leq \sin^{-1}(n_{d3}/n)$, the third light ray $I_3$ may pass through the second spacing layer 15, but not be fully reflected at the second spacing layer 15.

In response to the transmission period Period3 of the third light ray $I_3$ is the same as the transmission periods Period1 of the first light ray $I_1$, the following relational expression is satisfied:

$$2^*(h_1+h_2+h_3)^*\tan(\theta_3)=2^*h_1^*\tan(\theta_1).$$

Figure 7:
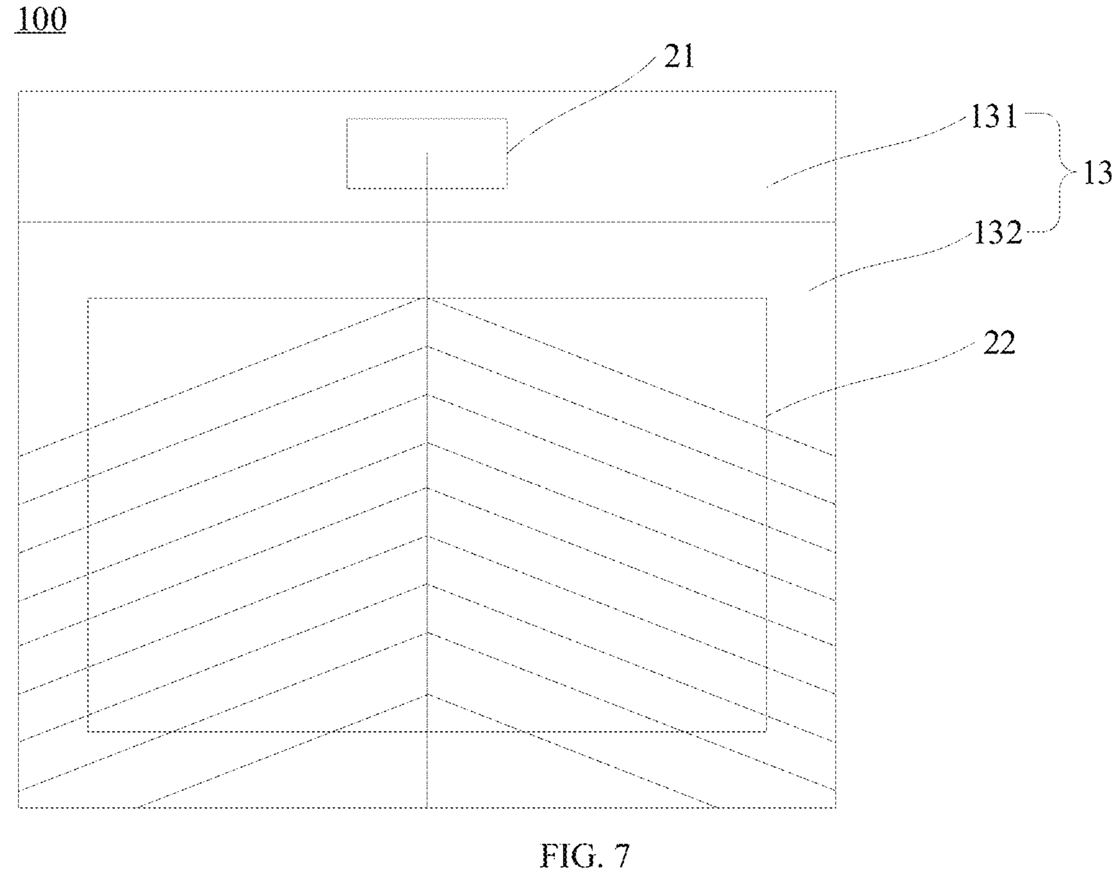
FIG. 7 is a first plane schematic view of the optical device in some embodiments of the present disclosure.

In some embodiments, as illustrated in FIG. 7, FIG. 7 is a first plane schematic view of the optical device 100 in some embodiments of the present disclosure, and the first out-coupling grating 22 is a two-dimensional grating.

Figure 8:
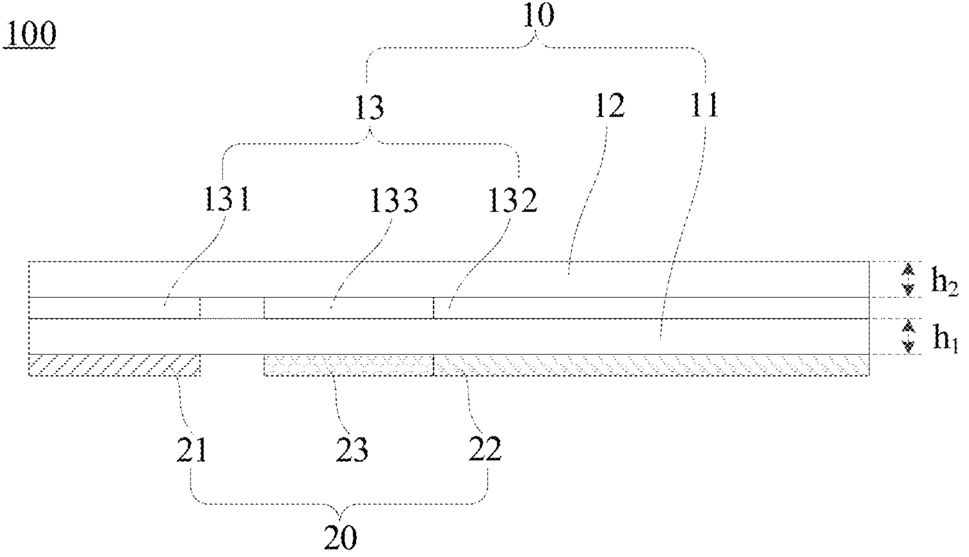
FIG. 8 is a fourth structural schematic view of the optical device in some embodiments of the present disclosure.
Figure 9:
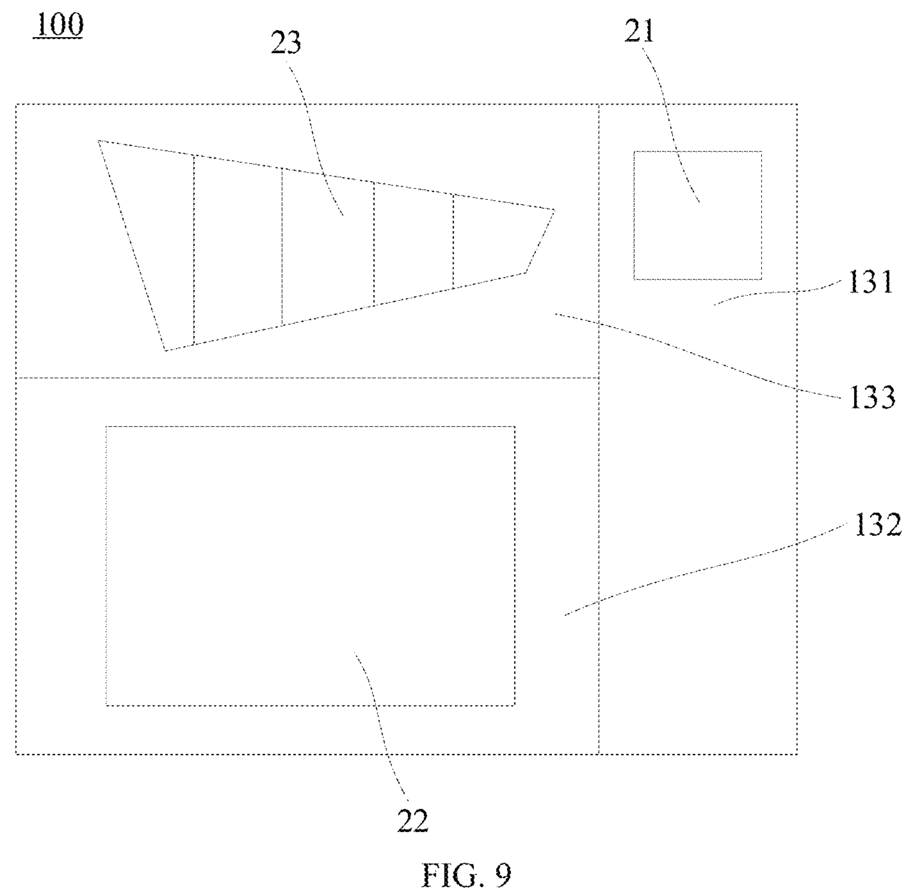
FIG. 9 is a second plane schematic view of the optical device in some embodiments of the present disclosure.

In some embodiments, as also illustrated in FIG. 8 and. FIG. 9, FIG. 8 is a fourth structural schematic view of the optical device 100 in some embodiments of the present disclosure, and FIG. 9 is a second plane schematic view of the optical device 100 in some embodiments of the present disclosure.

The first spacing layer 13 further includes a third region 133, and the third region 133 is between the first region 131 and the second region 132.

The grating assembly 20 further includes a first turning grating 23. The first turning grating 23 is disposed on the side of the first waveguide layer 11 away from the second waveguide layer 12. The first turning grating 23 corresponds to the third region 133. The first turning grating 23 may be configured to change the transmission direction of the light ray.

Due to the arrangement of the first turning grating 23, the in-coupling grating 21 and the first out-coupling grating 22 may be disposed in a staggered manner, and the light ray coupled in by the in-coupling grating 21 is transmitted to the first out-coupling grating 22 through the first turning grating 23.

In some embodiments, a second out-coupling grating is disposed on the outermost waveguide layer opposite to the first waveguide layer 11 in the waveguide assembly 10. The second out-coupling grating is disposed on the side of the outei most waveguide layer away from the first waveguide layer 11. The second out-coupling grating corresponds to the second region 132 of the first spacing layer 13.

By disposing the second out-coupling grating, the light rays of different viewing angles may be separately modulated by utilizing the characteristic that the light rays of different viewing angles have different times of action with the two sides of the waveguide assembly 10, thereby further improving the uniformity of the emergent light rays.

Figure 10:
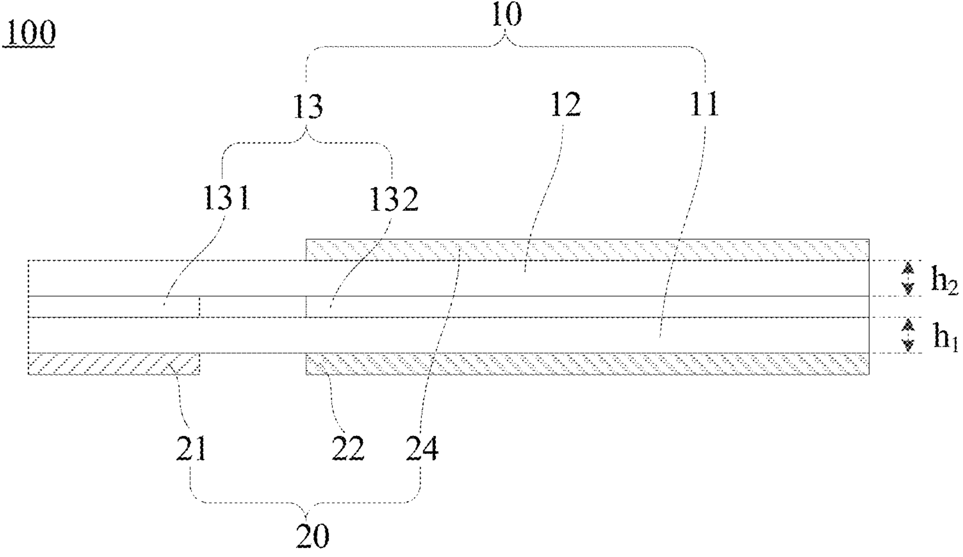
FIG. 10 is a fifth structural schematic view of the optical device in some embodiments of the present disclosure.

For example, as illustrated in FIG. 10, FIG. 10 is a fifth structural schematic view of the optical device 100 in some embodiments of the present disclosure.

The waveguide assembly 10 includes the first waveguide layer 11 and the second waveguide layer 12, so that the outermost waveguide layer opposite to the first waveguide layer 11 is the second waveguide layer 12. The second out-coupling grating 24 is disposed on the side of the second waveguide layer 12 away from the first waveguide layer 11. The second out-coupling grating 24 corresponds to the second region 132 of the first spacing layer 13.

In response to the waveguide assembly 10 further includes M waveguide layers, the outermost waveguide layer opposite to the first waveguide layer 11 is the waveguide layer furthest away from the first waveguide layer 11.

In some embodiments, the second out-coupling grating may also be the two-dimensional grating.

In some embodiments, in response to the first spacing layer 13 includes the third region 133 that is between the first region 131 and the second region 132, the second turning grating is further disposed on the outermost waveguide layer of the waveguide assembly 10 opposite to the first waveguide layer 11. The second turning grating is disposed on the side of the outermost waveguide layer away from the first waveguide layer 11. The second turning grating corresponds to the third region 133. The second turning grating may also be configured to change the transmission direction of the light ray.

Figure 11:
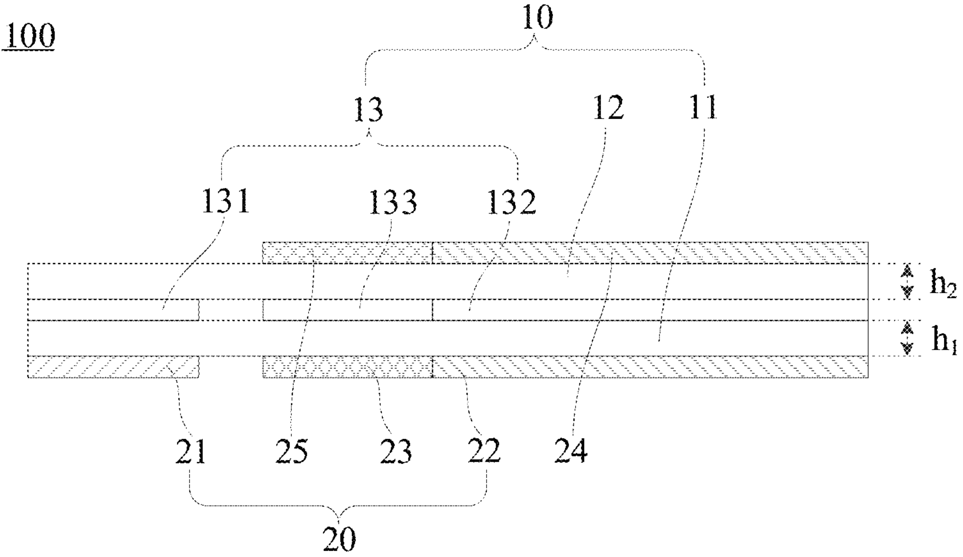
FIG. 11 is a sixth structural schematic view of the optical device in some embodiments of the present disclosure.

For example, as illustrated in FIG. 11, FIG. 11 is a sixth structural schematic view of the optical device 100 in some embodiments of the present disclosure.

The waveguide assembly 10 includes the first waveguide layer 11 and the second waveguide layer 12, so that the outermost waveguide layer opposite to the first waveguide layer 11 is the second waveguide layer 12. The second turning grating 25 is disposed on the side of the second waveguide layer 12 away from the first waveguide layer 11, and the second turning grating 25 corresponds to the third region 133.

Figure 12:
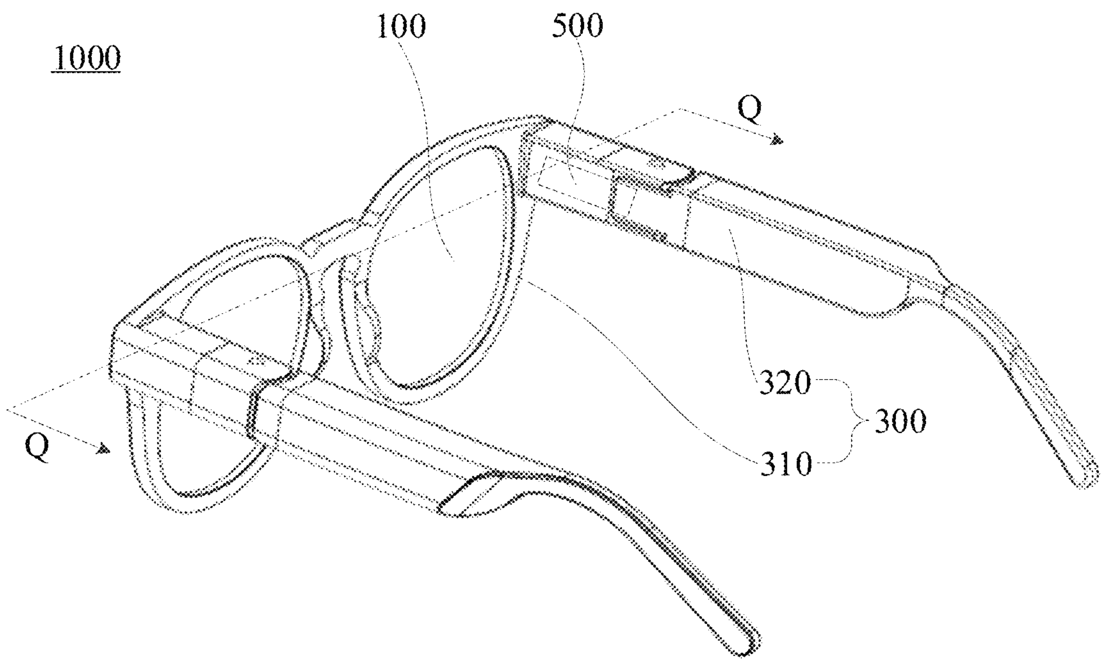
FIG. 12 is a stnictural schematic view of smart glasses in some embodiments of the present disclosure.
Figure 13:
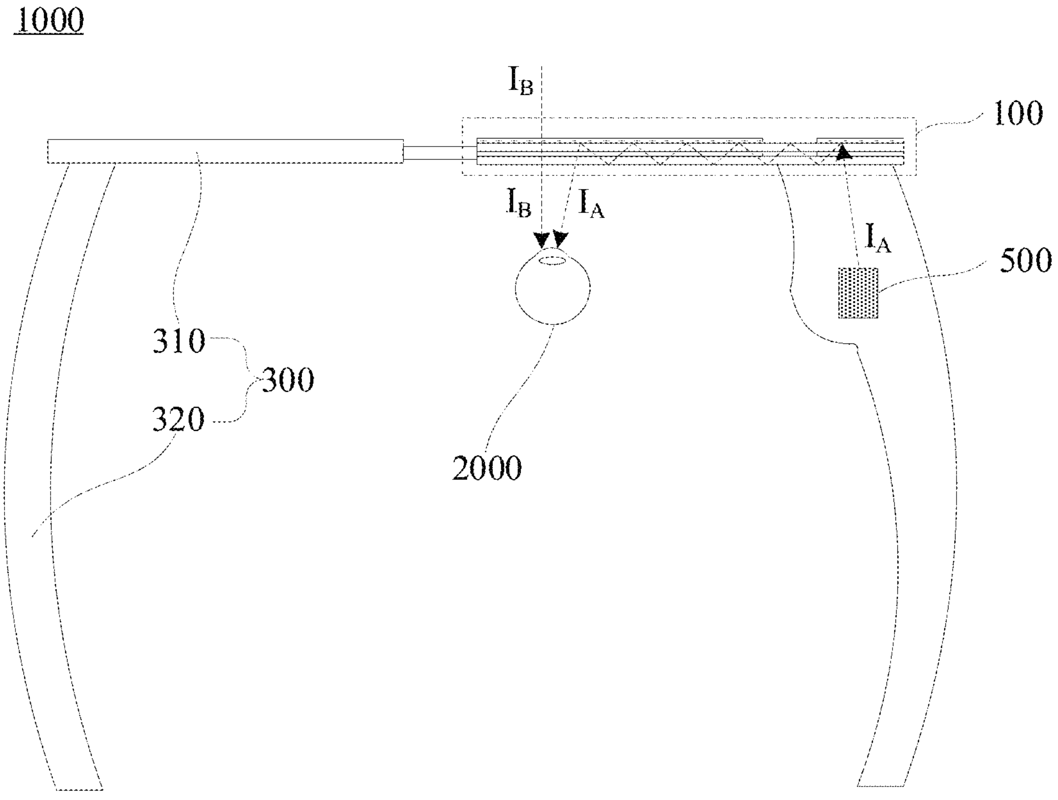
FIG. 13 is a cross-sectional schematic view of the smart glasses shown in FIG. 12 along a Q-Q direction.

An embodiment of the present disclosure further provides smart glasses, as illustrated in FIG. 12 and FIG. 13, FIG. 12 is a structural schematic view of smart glasses 1000 in some embodiments of the present disclosure. FIG. 13 is a cross-sectional schematic view of the smart glasses 1000 shown in FIG. 12 along a Q-Q direction.

The smart glasses 1000 include the above optical device 100, a frame 300, and an image source 500. The optical device 100 and the image source 500 are installed on the frame 300.

The frame 300 includes an eyeglass frame 310 and eyeglass legs 320 connected to the eyeglass frame 310. The eyeglass frame 310 may be configured to install the optical device 100. The external light rays may pass through the optical device 100, so that the user may observe a real scene of the outside. The eyeglass legs 320 are configured to allow the smart glasses 1000 to be worn on a face of the user. For example, the eyeglass legs 320 may be clamped on ears of the user to achieve wearing of the smart glasses 1000. The number of the eyeglass legs 320 may be 2, and two eyeglass legs 320 are symmetrically disposed, for example, the two eyeglass legs 320 may be respectively connected to two opposite ends of the eyeglass frame 310.

The image source 500 may be installed inside the eyeglass legs 320, which may not only facilitate the setting of the image source 500, but also realize the hiding of the image source 500. The image source 500 may be configured to generate the light rays corresponding to the virtual scene and project the light rays to the optical device 100 for transmission. For example, the image source 500 may be a micro projector.

As shown in FIG. 13, the image source 500 may generate the light ray $I_A$ corresponding to the virtual scene, and project the light ray $I_A$ onto the optical device 100. After being transmitted by the optical device 100, the light ray $I_A$ is emitted and finally received by a human eye 2000, so that the user may observe the virtual scene corresponding to the light ray $I_A$. The light ray $I_A$ is a mixture of the light rays of respective viewing angles. The light ray $I_A$ may include the first light ray $I_1$, the second light ray $I_2$, and the third light ray $I_3$.

On the other hand, an external light ray $I_B$ may pass through the optical device 100 and be directly received by the human eye 2000, so that the user may observe the real scene corresponding to the light ray $I_B$.

Thus, the user may observe the virtual scene and the real scene, thereby experiencing the combination of the virtual scene and the real scene.

In the smart glasses 1000 provided by the embodiment of the present disclosure, the first spacing layer 13 is disposed in the optical device 100, the first spacing layer 13 is defined as the first region 131 and the second region 132, the second region 132 may allow the first light ray of the first viewing angle to be fully reflected, and the second light ray of the second viewing angle may pass through the second region 132. Thus, the light rays of different viewing angles may be transmitted in different waveguide layers, and accordingly the transmission periods of the light rays of different viewing angles may be adjusted respectively, so that the transmission periods of the light rays of different viewing angles tend to be close to each other. Thus, the pupil density of the light rays of different viewing angles that are emitted by the optical device 100 may be close to each other, thereby improving the uniformity of the light rays emitted by the optical device 100. In response to the light rays of the virtual scene are combined with the light rays of the real scene, the user may observe a better image, thus the performance of the smart glasses 1000 may be improved.

In the description of the present disclosure, the terms, such as “first” and “second”, are only configured to distinguish similar objects, and cannot be understood as indicating or implying relative importance or implying the number of indicated technical features.

The waveguide assembly, the optical device, and the smart glasses provided by the embodiments of the present disclosure are described in detail. In the present disclosure, some or embodiments or examples are used to illustrate the principles and implementation methods of the present disclosure. The descriptions of the above embodiments are only used to help understand the present disclosure. Furthermore, for those of ordinary skill in the art, based on the idea of the present disclosure, there will be changes in the specific implementation and application scope. In summary, the contents of the present specification should not be construed as limiting the disclosure.

What is claimed is:

1. A waveguide assembly, comprising:

a first waveguide layer;

a second waveguide layer stacked with the first waveguide layer; and a first spacing layer arranged between the first waveguide layer and the second waveguide layer, wherein the first spacing layer comprises a first region and a second region, a refractive index of the first region is less than that of the first waveguide layer and that of the second waveguide layer, and a refractive index of the second region is less than that of the first region;

in response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray;

and the second region is configured to allow a second light ray of a second viewing angle in the light rays to pass through the second region, so that the first waveguide layer and the second waveguide layer are configured to jointly transmit the second light ray.

2. The waveguide assembly of claim 1, wherein a refractive index of the first waveguide layer is the same as a refractive index of the second waveguide layer.

3. The waveguide assembly of claim 2, wherein, the refractive index of the first waveguide layer and the refractive index of the second waveguide layer range from 1.6 to 2.1; and the refractive index of the second region ranges from 1.3 to 1.6.

4. The waveguide assembly of claim 2, wherein in order to fully reflect the first light ray in the second region and pass the second light ray through the second region, a diffraction angle of the first light ray and a diffraction angle of the second light ray satisfy the following relational expressions:

$$\theta_1 > \sin^{-1}(n_{d2}/n), \text{ and}$$

$$\theta_2 \geq \sin^{-1}(n_{d2}/n),$$

wherein n represents the refractive index of the first waveguide layer and the refractive index of the second waveguide layer, $n_{d2}$ represents the refractive index of the second region, $\theta_1$ represents the diffraction angle of the first light ray, and $\theta_2$ represents the diffraction angle of the second light ray.

5. The waveguide assembly of claim 4, wherein a transverse transmission period of the first light ray in the first waveguide layer is the same as a transverse transmission period of the second light ray in the first waveguide layer and the second waveguide layer.

6. The waveguide assembly of claim 5, wherein the first waveguide layer and the second waveguide layer satisfy the following relational expression:

$$2*(h_1+h_2)*\tan(\theta_2)=2*h_1*\tan(\theta_1),$$

wherein $h_1$ represents a thickness of the first waveguide layer, and $h_2$ represents a thickness of the second waveguide layer.

7. The waveguide assembly of claim 6, wherein, the thickness of the first waveguide layer ranges from 0.05 mm to 3 mm; and the thickness of the second waveguide layer ranges from 0.05 mm to 3 mm.

8. The waveguide assembly of claim 1, further comprising:

M waveguide layers, wherein the M waveguide layers are stacked in sequence from a side of the second waveguide layer away from the first waveguide layer;

wherein a Nth spacing layer is disposed between a N-th waveguide layer and a (N+1)-th waveguide layer, a refractive index of the Nth spacing layer is less than refractive indexes of the first waveguide layer to a (M+2)-th waveguide layer, and the first waveguide layer to a P-th waveguide layer are configured to jointly transmit a P-th light ray at a P-th viewing angle in the light rays; and M, N, P are positive integers, N is greater than or equal to 2 and less than or equal to M+1, and P is greater than or equal to 3 and less than or equal to M+2.

9. The waveguide assembly of claim 8, wherein the refractive index of the first waveguide layer, the refractive index of the second waveguide layer, and the refractive indexes of the M waveguide layers are the same.

10. The waveguide assembly of claim 9, wherein each of the M waveguide layers has a refractive index ranging from 1.6 to 2.1, and the N-th spacing layer has a refractive index ranging from 1.3 to 1.6.

11. The waveguide assembly of claim 9, wherein the transverse transmission period of the first light ray, the transverse transmission period of the second light ray, and a transverse transmission period of the P-th light ray are the same.

12. The waveguide assembly of claim 11, wherein each of the M waveguide layers has a thickness ranging from 0.05 mm to 3 mm.

13. An optical device, comprising:

a waveguide assembly, comprising:

a first waveguide layer;

a second waveguide layer stacked with the first waveguide layer; and a first spacing layer arranged between the first waveguide layer and the second waveguide layer, wherein the first spacing layer comprises a first region and a second region, a refractive index of the first region is less than that of the first waveguide layer and that of the second waveguide laver, and a refractive index of the second region is less than that of the first region;

in response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray; and the second region is configured to allow a second light ray of a second viewing angle in the light rays to pass through the second region, so that the first waveguide layer and the second waveguide layer are configured to jointly transmit the second light ray;

an in-coupling grating disposed on a side of the first waveguide layer away from the second waveguide layer, wherein the in-coupling grating corresponds to the first region; and a first out-coupling grating disposed on the side of the first waveguide layer away from the second waveguide layer, wherein the first out-coupling grating corresponds to the second region;

in response to the light rays are transmitted from the side of the second waveguide layer towards the first region to the first waveguide layer, the light ray is coupled into the waveguide assembly through the in-coupling grating, and the first light ray and the second light ray are coupled out by the first out-coupling grating.

14. The optical device of claim 13, wherein the first out-coupling grating is a two-dimensional grating.

15. The optical device of claim 13, wherein, the first spacing layer further comprises a third region between the first region and the second region; and the optical device further comprises a first turning grating disposed on the side of the first waveguide layer away from the second waveguide layer; and the first turning grating corresponds to the third region.

16. The optical device of claim 13, wherein a second out-coupling grating is disposed on an outermost waveguide layer opposite to the first waveguide layer in the waveguide assembly, the second out-coupling grating is disposed on a side of the outei most waveguide layer away from the first waveguide layer, and the second out-coupling grating corresponds to the second region.

17. The optical device of claim 16, wherein the second out-coupling grating is a two-dimensional grating.

18. The optical device of claim 16, wherein in response to the first spacing layer comprises a third region between the first region and the second region, the second turning grating is disposed on the side of the outermost waveguide layer away from the first waveguide layer, and the second turning grating corresponds to the third region.

19. The optical device of claim 13, wherein a refractive index of the first waveguide layer is the same as a refractive index of the second waveguide layer.

20. Smart glasses, comprising:

a frame; and an optical device installed on the frame, wherein the optical device comprises:

a waveguide assembly comprising a first waveguide layer, a second waveguide layer stacked with the first waveguide layer, and a first spacing layer arranged between the first waveguide layer and the second waveguide layer, wherein the first spacing layer comprises a first region and a second region, a refractive index of the first region is less than that of the first waveguide layer and that of the second waveguide layer, and a refractive index of the second region is less than that of the first region;

in response to light rays are transmitted from a side of the second waveguide layer towards the first region to the first waveguide layer, the first region is configured to reduce a transverse transmission period of the light rays, the second region is configured to allow a first light ray of a first viewing angle in the light rays to be fully reflected, so that the first waveguide layer is configured to independently transmit the first light ray; and the second region is configured to allow a second light ray of a second viewing angle in the light rays to pass through the second region; so that the first waveguide layer and the second waveguide layer are configured to jointly transmit the second light ray;

an in-coupling grating disposed on a side of the first waveguide layer away from the second waveguide layer, wherein the in-coupling grating corresponds to the first region; and a first out-coupling grating disposed on the side of the first waveguide layer away from the second waveguide layer, wherein the first out-coupling grating corresponds to the second region;

in response to the light rays are transmitted from the side of the second waveguide layer towards the first region to the first waveguide layer, the light ray is coupled into the waveguide assembly through the in-coupling grating, and the first light ray and the second light ray are coupled out by the first out-coupling grating.

* * * * *